(12) United States Patent
Sekine et al.

(10) Patent No.: US 6,168,713 B1
(45) Date of Patent: Jan. 2, 2001

(54) ELECTROSTATIC CHARGE REMOVING APPARATUS

(75) Inventors: Hitoshi Sekine; Kazuto Sawada, both of Ibaraki-Pref.; Katsuhisa Yamada, Aichi-Pref., all of (JP)

(73) Assignees: Kyosan Denki Co., Ltd., Ibaraki-Pref.; Denso Corporation, Aichi-Pref., both of (JP)

(*) Notice: Under 35 U.S.C. 154(b), the term of this patent shall be extended for 0 days.

(21) Appl. No.: 09/212,241

(22) Filed: Dec. 16, 1998

(30) Foreign Application Priority Data

Dec. 19, 1997 (JP) .................................................... 9-364385

(51) Int. Cl.[7] ........................... B01D 35/14; B01D 35/02; B01D 35/26; B01D 35/06; F02M 37/22
(52) U.S. Cl. ........................ 210/172; 210/243; 210/416.4
(58) Field of Search ................................ 210/243, 416.4, 210/172; 123/509, 510, 514

(56) References Cited

U.S. PATENT DOCUMENTS 3,186,551 * 6/1965 Dornauf .
4,211,639 * 7/1980 Jackson .
4,895,640 * 1/1990 Jackson .
4,999,108 * 3/1991 Koch et al. .
5,380,432 * 1/1995 Brandt .
5,647,330 * 7/1997 Sawert et al. .

FOREIGN PATENT DOCUMENTS 195 30 526 * 2/1997 (DE) .
61-8102 * 1/1986 (JP) .
9-268957 * 10/1997 (JP) .

* cited by examiner

Primary Examiner—Thomas M. Lithgow
(74) Attorney, Agent, or Firm—Flynn, Thiel, Boutell & Tanis, P.C.

(57) ABSTRACT

An electrostatic charge removing apparatus in a fuel filter is capable of reliably removing electrostatic charge generated in a fuel filter and of reducing cost and weight of the fuel filter by escaping or discharging the electrostatic charge from parts of the fuel filter other than a case of the fuel filter. The fuel filter includes a filter portion that is connected to an outlet of a fuel pump disposed in a fuel tank and is clamped by end plates, a case housing the filter portion therein, wherein the end plates are formed of a conductive material, and a projection that penetrates a cap is formed on one end plate and is grounded.

3 Claims, 7 Drawing Sheets

ELECTROSTATIC CHARGE REMOVING APPARATUS

BACKGROUND OF THE INVENTION

1. Field of the Invention

The invention relates to an electrostatic charge removing apparatus in a fuel filter installed in a fuel supply system of an automobile, more particularly to an electrostatic charge removing apparatus in a fuel filter installed in a fuel supply system wherein a fuel supply pump and a fuel filter are provided in a fuel tank.

2. Related Art

It has been hitherto known to provide a fuel supply pump and a fuel filter in a fuel tank so as to simplify a fuel supply system and at the same time to reduce the influence of heat on the fuel filter.

In the known fuel supply system, a case of a fuel filter is formed of a conductive body and it is grounded to discharge electrostatic charge so as to remove the electrostatic charge that is charged in the fuel filter.

This is described with reference to FIG. 8 wherein a fuel pump 2 is disposed inside a fuel tank 1, and a fuel filter 4 is connected to an outlet 3 of the fuel pump 2. The fuel filter 4 is a normal fuel filter for removing foreign matters in fuel. A filter portion 4A formed of a filter paper, etc. is provided in the fuel filter 4, and fuel passed through the filter portion 4A is once collected at a fuel reservoir 4B and is supplied from an outlet pipe 4C to an engine portion (not shown).

A case 4D constituting the fuel filter 4 is formed of a conductive material. The conductive material includes not only a conductive metal sheet such as iron, aluminum but also a conductive synthetic resin including metal powder, and a conductive synthetic resin including carbon fiber.

The case 4D of the fuel filter 4 is grounded to the ground 6 via a lead 5, whereby electrostatic charge charged in the case 4D of the fuel filter 4 is discharged.

Figure 8:
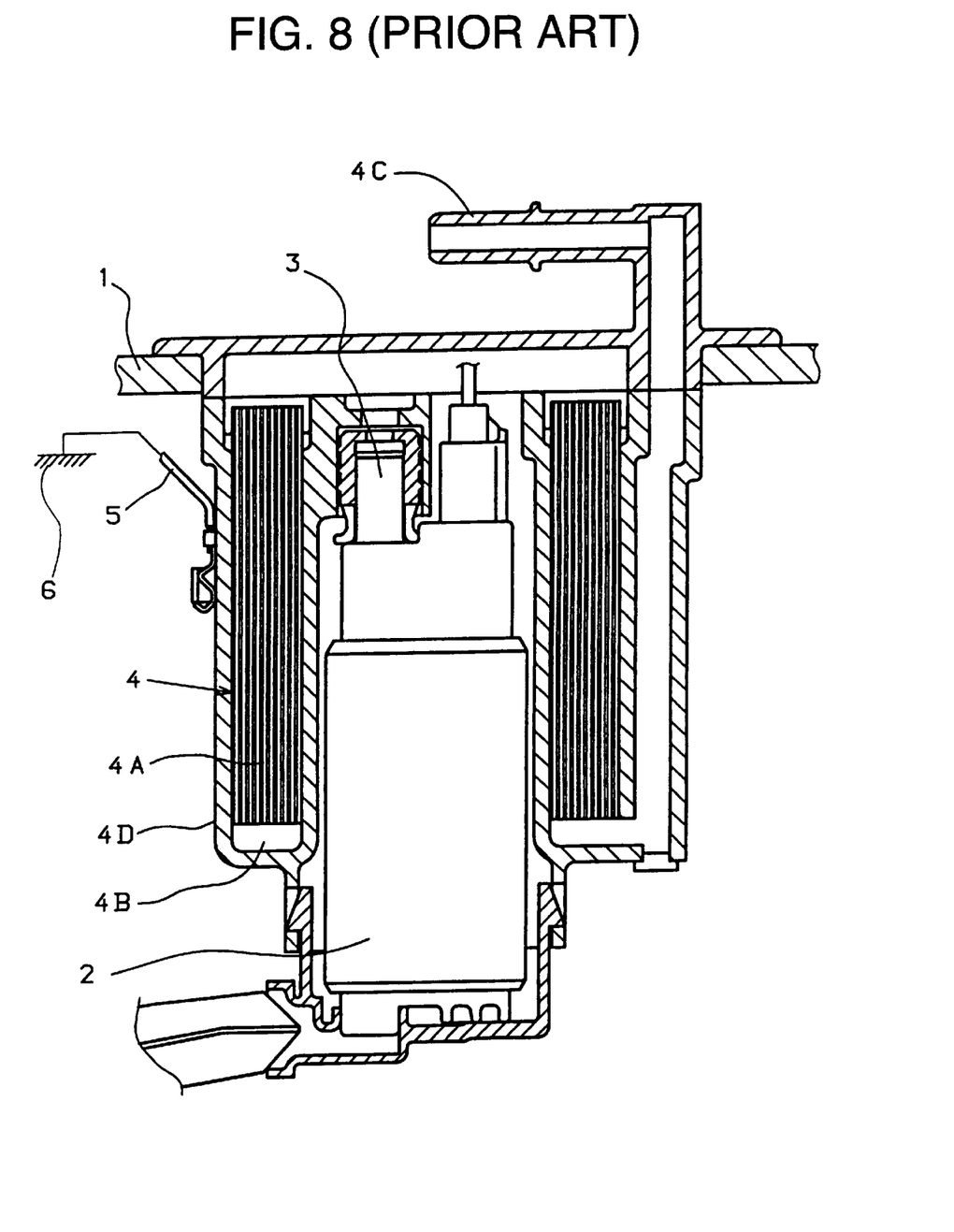
FIG. 8 is a plan view of a conventional electrostatic charge removing apparatus.

However, there are the following problems in the aforementioned electrostatic charge removing apparatus in the conventional fuel supply system shown in FIG. 8.

First of all, we study a mechanism of the generation of an electrostatic charge.

A surface of the case 4D or a surface of the filter portion 4A is rubbed against fuel when fuel flows, thereby generating electrostatic charge. In the fuel filter 4, the filter portion 4A is frequently rubbed against fuel so that electrostatic charge is frequently generated in the filter portion 4A. However, in a system to ground the conventional case 4D, the electrostatic charge generated in the filter portion 4A cannot be sufficiently removed.

Further, since a conductive material costs high and is heavy in weight, the fuel filter 4 becomes high in cost and increases in weight as a whole if the entire case 4D having a large capacity of the fuel filter 4 is formed of a conductive material.

SUMMARY OF THE INVENTION

It is therefore an object of the invention to provide a fuel filter capable of improving the drawback of a conventional fuel filter, and of escaping electrostatic charge from the parts other than a case of the fuel filter having a large capacity to reduce the cost and weight of the fuel filter.

To achieve the above object, the fuel filter of the present invention is characterized in the following constructions.

That is, in the electrostatic charge removing apparatus in a fuel filter that filters fuel used in automobiles and is connected to a downstream of a fuel pump disposed inside a fuel tank, the fuel filter comprises a container formed of a cap and a case, a filter portion disposed inside the container, wherein at least one of members constituting the filter portion is formed of a conductive material and is grounded.

The construction of the invention is further characterized in that the filter member and the protector are clamped by end plates in the filter portion and one end plate is formed of a conductive material and is grounded, while the projection that penetrates the case or cap is formed on one end plate and is grounded, and further characterized in that a connector connecting to the terminal is formed on the cap and the projection is disposed inside the connector, and further characterized in that the protector is formed of a conductive material and is grounded, while the projection that penetrates the case or cap is formed on the protector and is grounded.

In the electrostatic charge removing apparatus in a fuel filter that filters fuel used in automobiles and is connected to a downstream of a fuel pump disposed inside a fuel tank, the construction of the invention is further characterized in that the fuel filter comprises a container formed of a cap and a case, a filter portion disposed inside the container, wherein a filter member constituting the filter portion is formed of a conductive material and is grounded, and further characterized in that the filter member is formed of a conductive material.

In the electrostatic charge removing apparatus in a fuel filter that filters fuel used in automobiles and is connected to a downstream of a fuel pump disposed inside a fuel tank, the construction of the invention is further characterized in that the fuel filter comprises a container formed of a cap and a case, a filter member, a protector and end plates respectively disposed inside the container, the filter member and the protector being clamped by end plates, and seal members mounted on both ends of the end plates, wherein the cap is formed of a conductive material and is grounded, and further characterized in that the end plates and the seal members are respectively formed of a conductive material.

In the electrostatic charge removing apparatus in a fuel filter that filters fuel used in automobiles and is connected to a downstream of a fuel pump disposed inside a fuel tank, the construction of the invention is further characterized in that the fuel filter comprises a container formed of a cap and a case, a filter member, a protector and end plates respectively disposed inside the container, the filter member and the protector being clamped by end plates, and seal members mounted on one end of the end plates, wherein the cap is formed of a conductive material and is grounded, and further characterized in that the filter member is formed of a conductive material.

PREFERRED EMBODIMENT OF THE INVENTION

Figure 1:
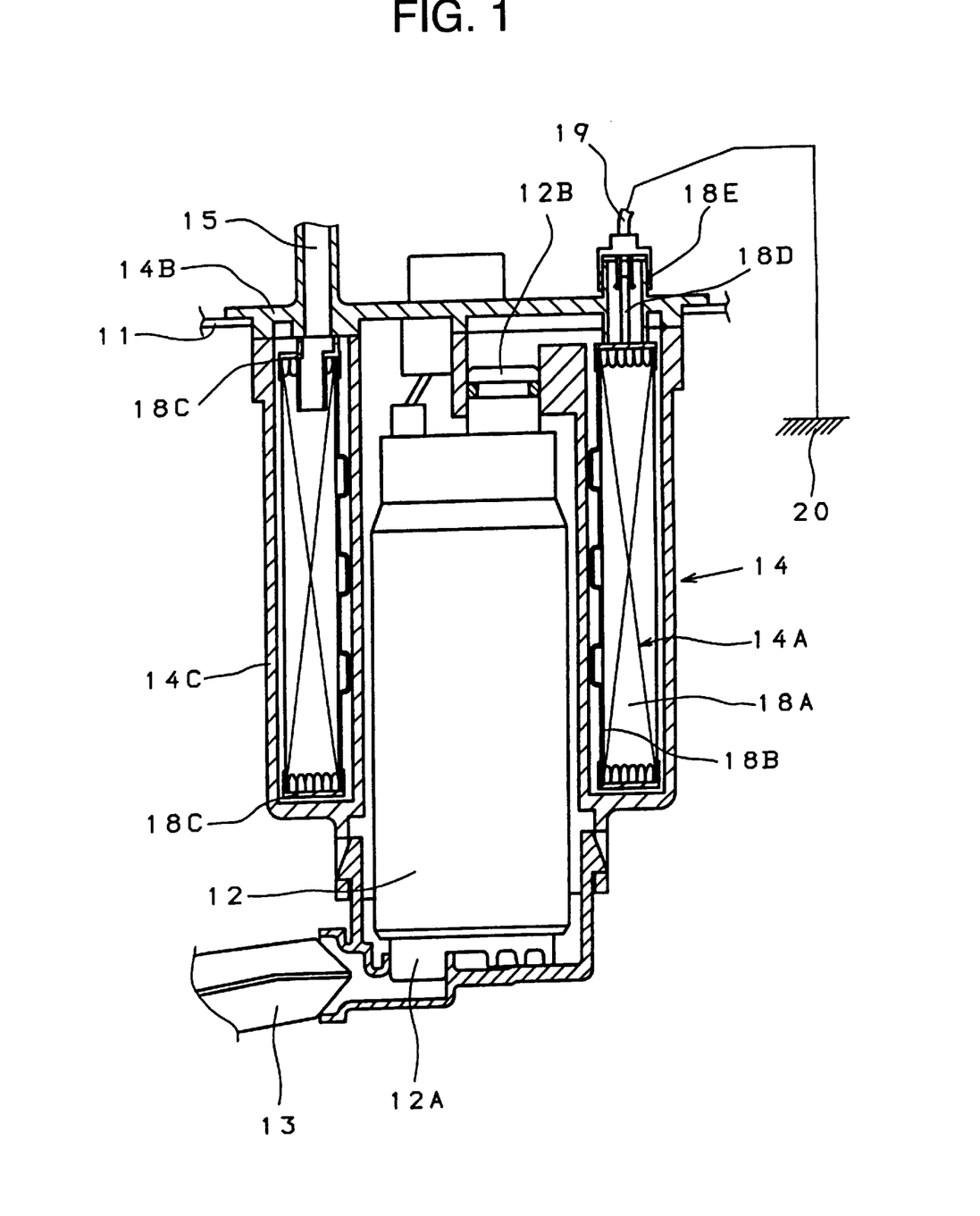
FIG. 1 is sectional view showing an example of a fuel filter to which the invention is applied.
Figure 2:
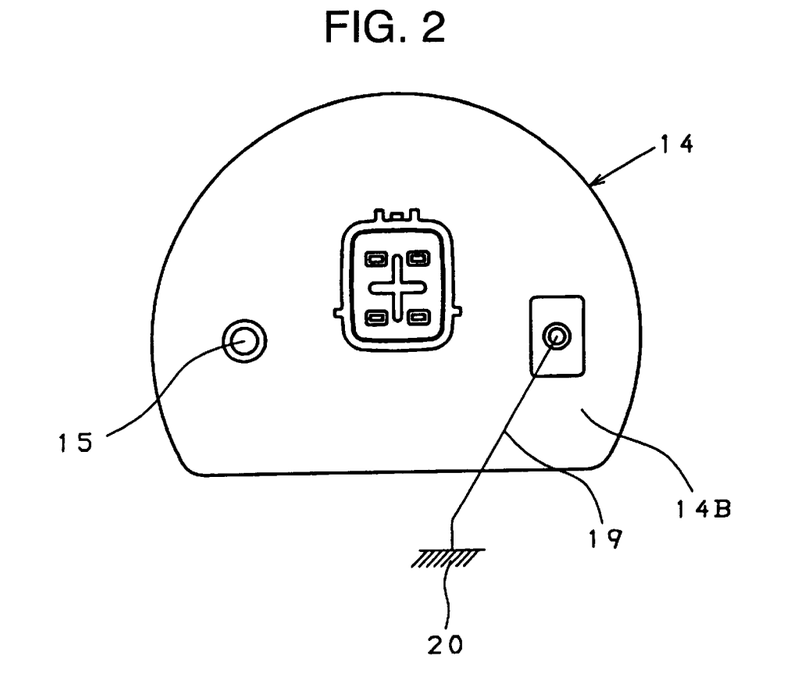
FIG. 2 is a plan view of an electrostatic charge removing apparatus according to a first embodiment of the invention.
Figure 3:
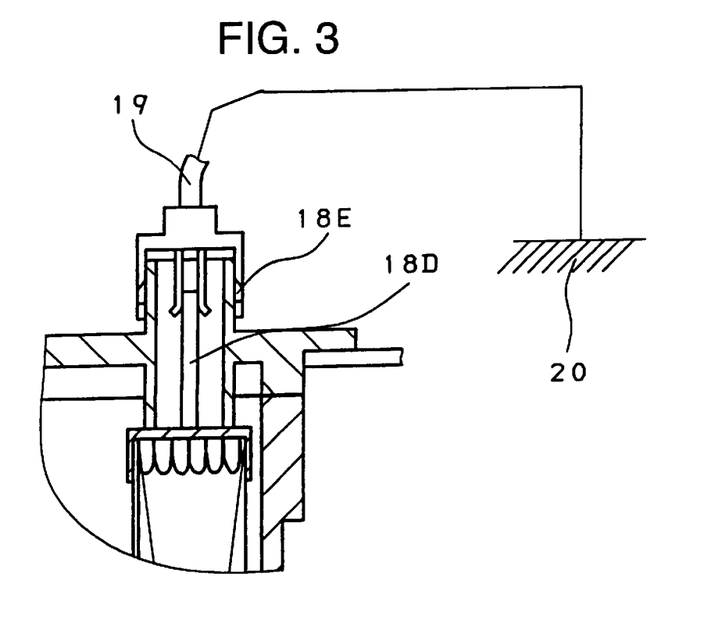
FIG. 3 is a sectional view taken along a line A—A in FIG. 2.

An electrostatic charge removing apparatus according to a first embodiment of the invention will be now described with reference to FIGS. 1 to 3, wherein FIG. 1 is a schematic sectional view showing a fuel filter, FIG. 2 is a plan view of FIG. 1 and FIG. 3 is a sectional view partially enlarging one end plate of the fuel filter in FIG. 1.

In the first embodiment shown in FIGS. 1 to 3, one of end plates that hold a filter portion of the fuel filter is grounded.

That is, a fuel pump 12 is disposed inside a fuel tank 11, and a fuel filter 13 is connected to an inlet 12A provided at the upper stream of the fuel pump 12. The fuel filter 13 removes relatively large foreign matters in fuel and is formed of a net body.

A fuel filter 14 is connected to an outlet 12B provided at the downstream of the fuel pump 12. The fuel filter 14 is a normal fuel filter for removing even small foreign matters in fuel.

A filter portion 14A formed of a filter paper, etc. is provided in the fuel filter 14, and fuel discharged from the fuel pump 12 passes from the outside of the filter portion 14A to the inside thereof. A fuel outlet passage 15 is provided inside the filter portion 14A to supply fuel toward an engine portion (not shown).

The filter portion 14A is composed of a filter member 18A formed of a filter paper, etc., a protector 18B for reinforcing the filter member 18A from the inside thereof and end plates 18C for holding upper and lower ends of the filter member 18A and protector 18B. In the first embodiment, the end plates 18C are respectively formed of a conductive material. The conductive material includes not only metal such as iron, aluminum but also a conductive synthetic resin prepared by mixing conductive metal material as powder and a synthetic resin including carbon fiber, and it may include any material if it suffices a conductive function. Both the filter member 18A and the protector 18B may be also formed of a conductive material.

A case of the fuel filter 14 is divided into a cap 14B and a body case 14C. One of the end plates 18C has a cylindrical projection 18D which penetrates the cap 14B of the fuel filter 14 and extends therefrom. A connector 18E on which a terminal for grinding purpose is mounted is formed on the cap 14B, and the projection 18D is connected to a lead 19 when the terminal is mounted on the connector 18E, so that the lead 19 is connected to the ground 20, thereby discharging the electrostatic charge collected at one end plate 18C.

In the explanation of the first embodiment, the end plates 18C are formed of a metal sheet made of a conductive material or a conductive resin. Further, in the first embodiment, although the cap 14B is formed of a nonconductive material, it may be formed of a conductive material according to the invention.

The operation of the electrostatic charge removing apparatus according to the first embodiment will be described hereinafter with reference to FIGS. 1 to 3.

When the fuel pump 12 is operated, fuel in the fuel tank 11 passes through the fuel filter 13 and it is drawn in the fuel pump 12 through the inlet 12A, then it passes from the outlet 12B to the filter portion 14A of the fuel filter 14. The fuel passed through the filter portion 14A is supplied from the fuel outlet passage 15 to an engine portion, not shown.

When the fuel passes through the filter member 18A constituting the filter portion 14A of the fuel filter 14, electrostatic charge is generated in the filter portion 14A owing to the rubbing operation therebetween. The thus generated electrostatic charge flows to the end plates 18C, and it is discharged to the ground 20 from the end plates 18C through the lead 19.

Even if the filter member 18A and the protector 18B respectively constituting the filter portion 14A are formed of a nonconductive material, the electrostatic charge is drawn to the end plates 18C in the case that the end plates 18C are formed of a conductive material.

Figure 4:
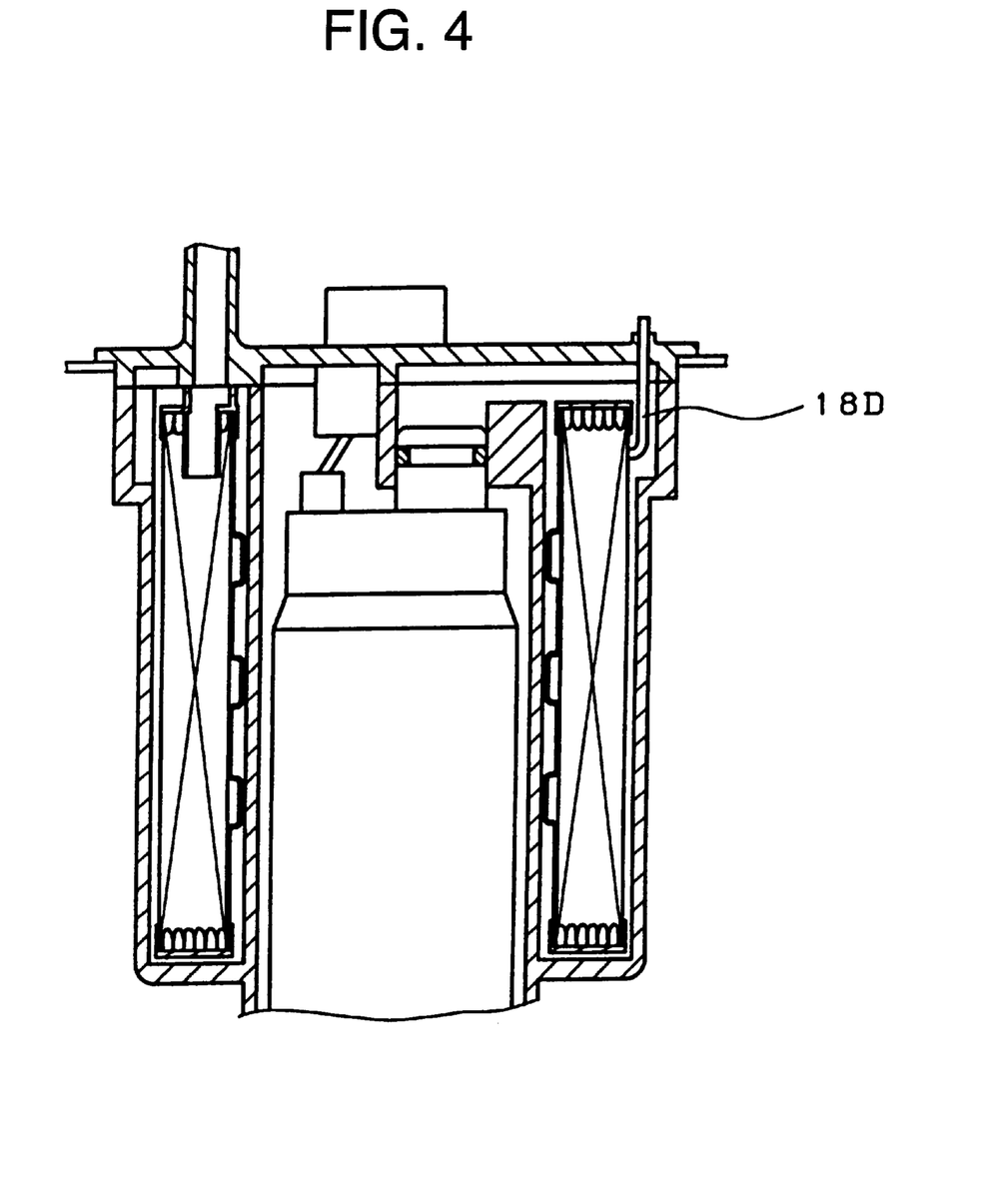
FIG. 4 is a plan view of an electrostatic charge removing apparatus according to a second embodiment of the invention.
Figure 5:
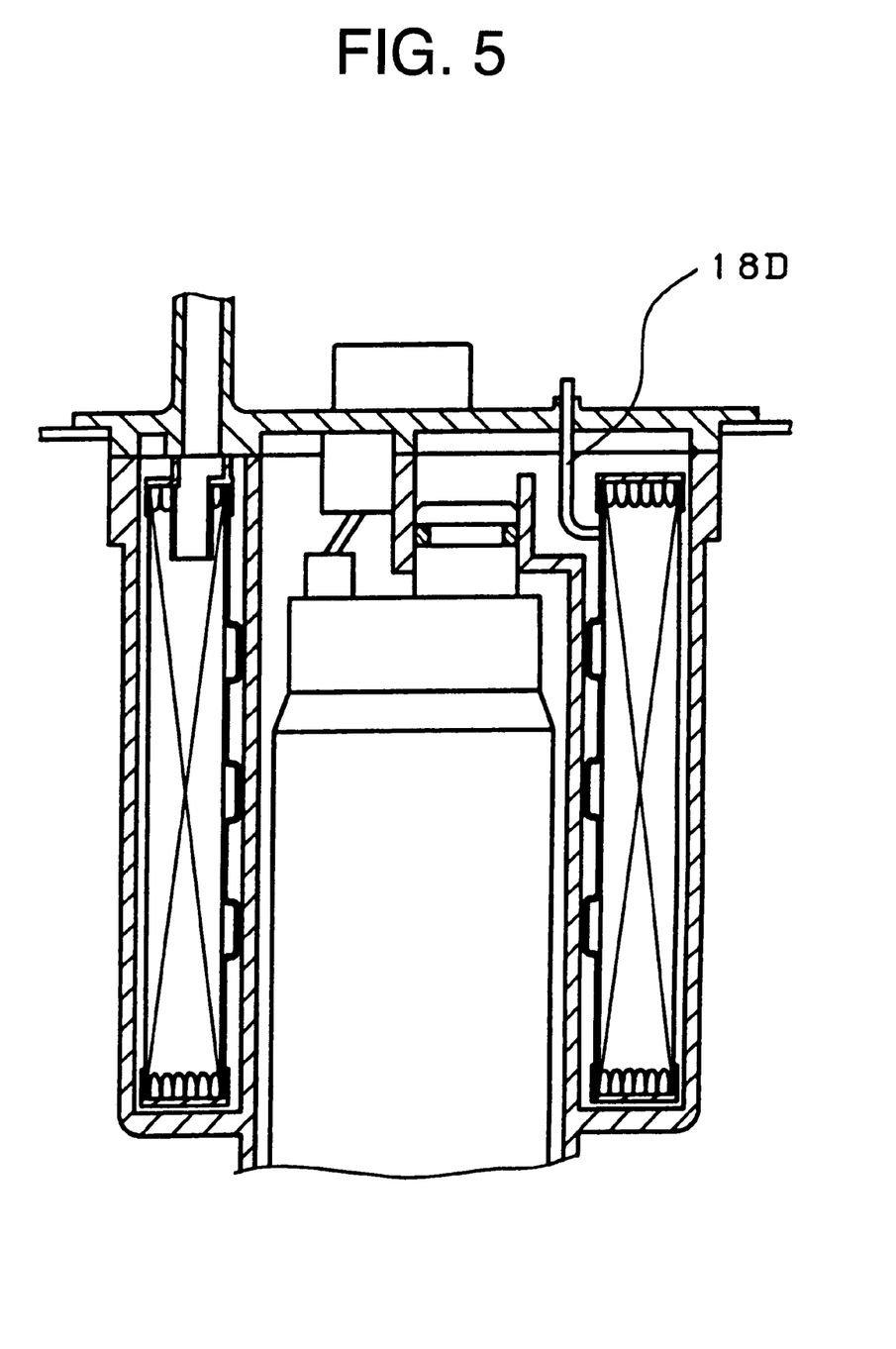
FIG. 5 is a plan view of an electrostatic charge removing apparatus according to a third embodiment of the invention.

In the electrostatic charge removing apparatus according to second and third embodiments of the invention as shown in FIGS. 4 and 5, it is structured that the projection 18D projects from the filter member 18A (FIG. 4) and from the protector 18B (FIG. 5), and the projection 18D is grounded. In these embodiments, both the filter member 18A and the protector 18B are respectively formed of a conductive material.

Figure 6:
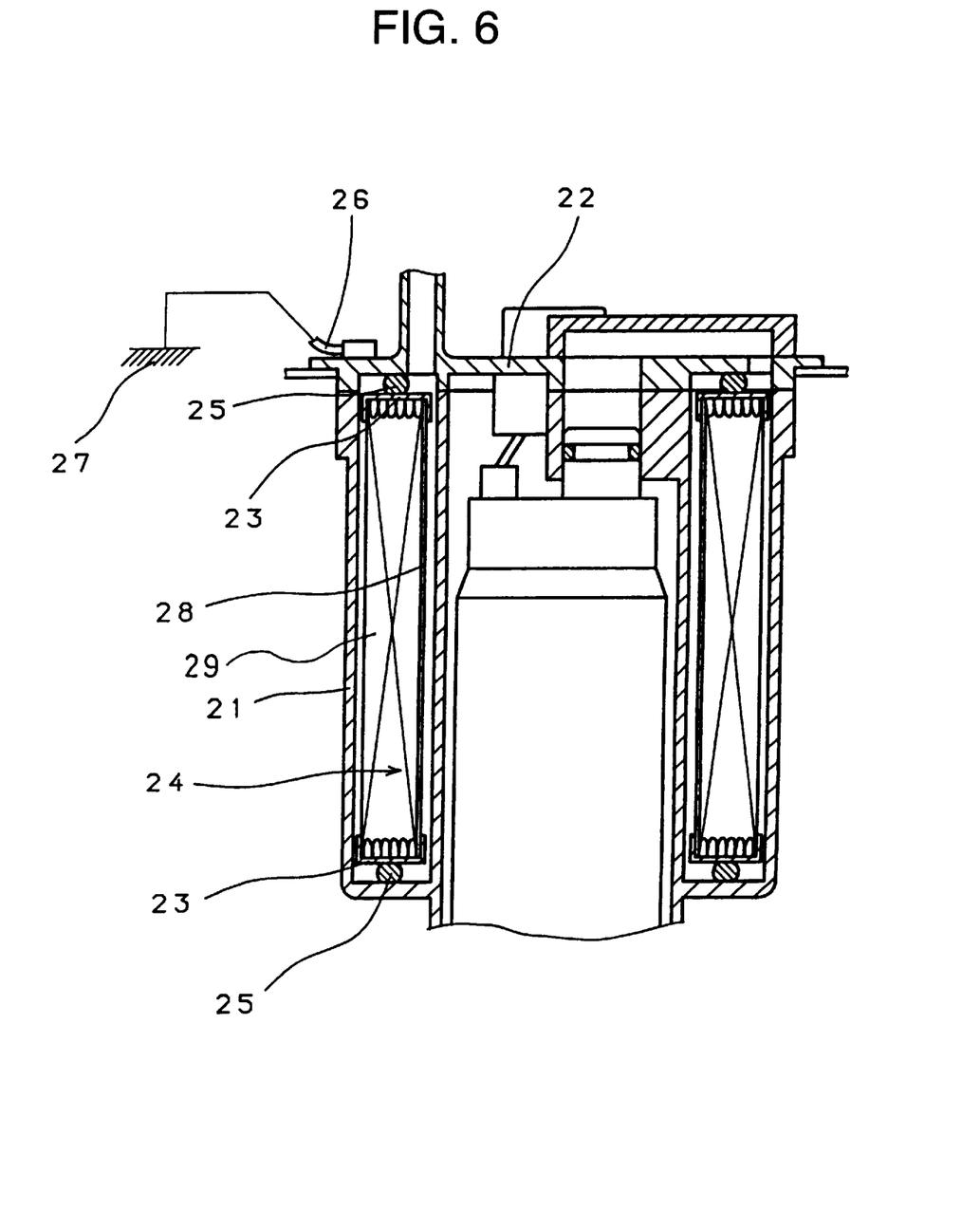
FIG. 6 is a plan view of an electrostatic charge removing apparatus according to a fourth embodiment of the invention.
Figure 7:
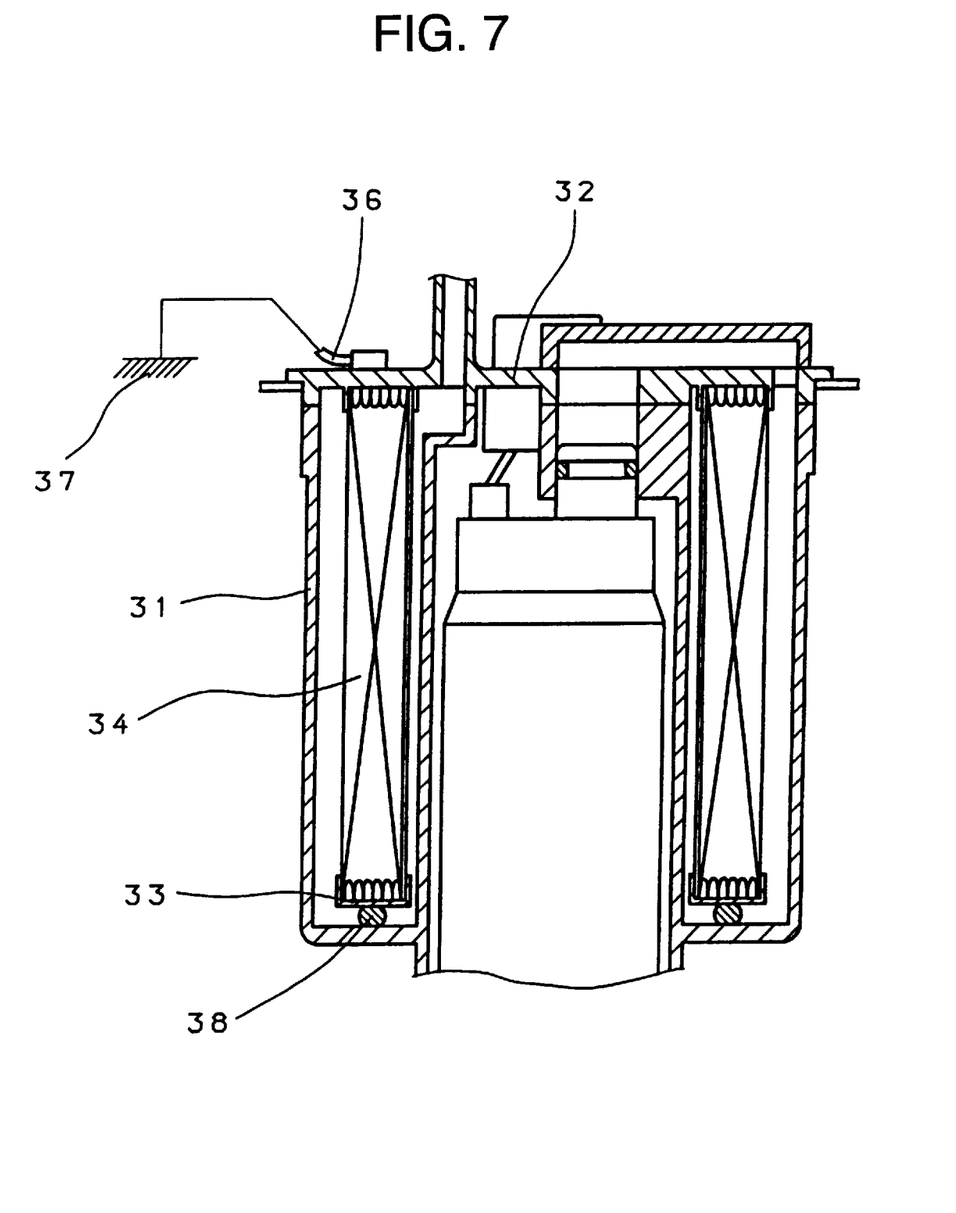
FIG. 7 is a plan view of an electrostatic charge removing apparatus according to a fifth embodiment of the invention.

Although the projection is formed on one end plate and it projects outside the case and it is grounded to discharge an electrostatic charge in the first embodiment shown in FIG. 3, a lead is directly connected to a cap and electrostatic charge is directly discharged from the cap in the fourth and fifth embodiments shown in FIGS. 6 and 7.

First, in the fourth embodiment shown in FIG. 6, a case 21 is covered with a cap 22. The case 21 is formed of a nonconductive material and the cap 22 is formed of a conductive material. End plates 23 are formed of a conductive material and a filter portion 24 is clamped and held by the upper and lower end plates 23. The filter portion 24 is formed of a conductive material or a nonconductive material that forms a normal filter member, and it divides the inner portion of the case 21 into an inner side and outer side. Seal members 25 are provided between the upper and lower end plates 23, the case 21 and the cap 22, and they seal an inlet chamber and an outlet chamber respectively formed in the inner and outer sides of the case 21 partitioned by the filter portion 24. A lead 26 for grounding is connected to the cap 22, and it is connected to the ground 27.

A protector 28 having a plurality of apertures defined therein is attached to the inner and outer surfaces of the filter portion 24. The protector 28 prevents the deformation of a filter member 29, and it is not always necessary to be provided.

In the fourth embodiment shown in FIG. 6, electrostatic charge generated in the filter portion 24 is escaped to the ground 27 via the end plates 23, the seal members 25 and the lead 26.

In the fifth embodiment shown in FIG. 7, a case 31 is covered with a cap 32. The case 31 is formed of a nonconductive material and the cap 32 is formed of a conductive material. End plates 33 are formed of a conductive material or a nonconductive material, while a filter portion 34 is clamped and held by the cap 32 and the end plates 33. The filter portion 34 is formed of a conductive material or nonconductive material, and it divides the inner portion of the case 31 into an inner side and an outer side. The filter portion 34 is connected to the cap 32 and it seals an inlet chamber and an outlet chamber respectively formed in the inner and outer sides of the case 31 partitioned by the filter portion 34. A lead 36 for grounding is connected to the cap 32, and it is also connected to the ground 37. Seal members 38 are provided between the end plates 33 and the case 31, thereby sealing the inlet and outlet chambers formed in the inner and outer sides of the case 31 partitioned by the filter portion 34. In the fifth embodiment shown in FIG. 7, electrostatic charge generated in the filter portion 34 is discharged to the ground 37 via cap 32 and the lead 36.

The electrostatic charge removing apparatus according to the invention set forth above has the following effects.

Since the filter portion where electrostatic charge is frequently generated can be grounded, the thus generated electrostatic charge can be reliably removed.

Further, it is possible to reduce the frequency of use of a conductive material that is heavy in weight and costs high.

What is claimed is:

1. A fuel filter comprises:

a container formed of a cap and a case;

a filter member, a protector and end plates respectively disposed inside the container, the filter member and the protector being clamped by the end plates; and seal members formed of a conductive material and mounted on both ends of the end plates;

wherein the cap and the end plates are formed of a conductive material and the cap is grounded.

2. A fuel filter comprising:

a container formed of a cap and a case;

a filter member, a protector and end plates respectively disposed inside the container, the filter member and the protector being clamped by the end plates; and seal members formed of a conductive material and mounted on both ends of the end plates;

wherein the cap, the end plates and the filter member are respectively formed of a conductive material and the cap is grounded.

3. A fuel filter comprising:

a filter portion for filtering fuel and having sufficient conductivity for discharging electrostatic charge;

a container formed of an electrically insulating resin, and housing the filter portion therein, said container including an opening;

a conductive member mounted on the container to close the opening, and having sufficient conductivity for discharging electrostatic charge;

elastic bodies disposed between the conductive member and the filter portion to contact therebetween, and having sufficient conductivity for discharging electrostatic charge, said elastic bodies being elastically deformed; and a grounding member electrically connected to the conductive member to ground the conductive member.

* * * * *